United States Patent Office 3,053,914
Patented Sept. 11, 1962

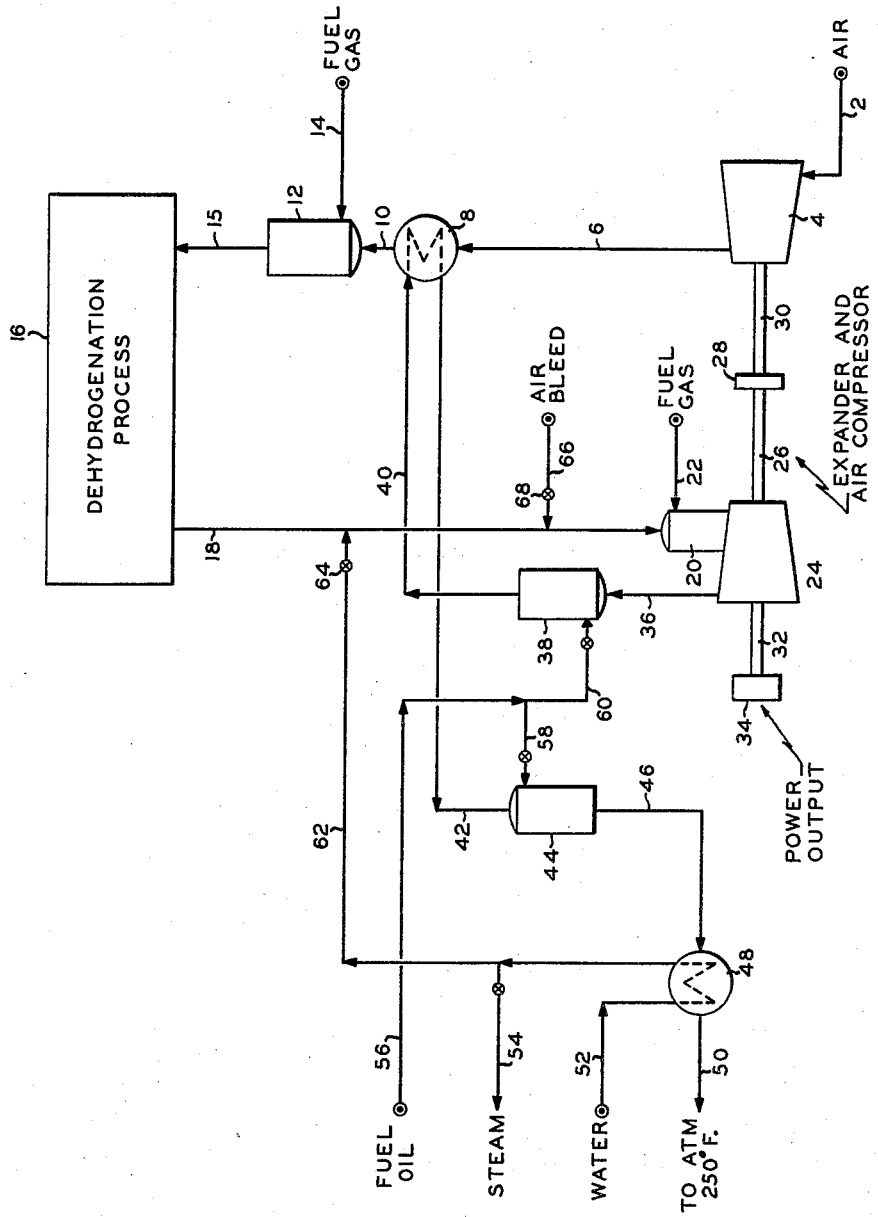

3,053,914
CATALYTIC REGENERATION
Sidney M. Frank, Chatham, and Fritz W. Peterson, Elberon, N.J., and Robert W. Pfeiffer, Bronxville, N.Y., assignors to The M. W. Kellogg Company, Jersey City, N.J., a corporation of Delaware
Filed Nov. 13, 1956, Ser. No. 621,706
4 Claims. (Cl. 260—683.3)

This invention relates to a new and improved method for effecting catalytic regeneration. In one aspect, the invention is directed to the improved method for regenerating the catalyst and supplying the necessary heat to the reaction zone of a dehydrogenation process.

The catalytic dehydrogenation of hydrocarbons having from two to five carbon atoms is well known and of considerable importance. The conventional method for executing these reactions is (1) to pass preheated hydrocarbon vapors sometimes admixed with diluent gases in contact with a suitable dehydrogenation catalyst at a temperature, pressure and space velocity conducive to effect the desired dehydrogenation reaction and, (2) to periodically remove carbonaceous material deposited on the catalyst during the dehydrogenation reaction. Such processes have heretofore been termed cyclic since they were effected in a process containing a plurality of fixed catalyst beds which were on alternate periods of hydrocarbon conversion and regeneration. During the regeneration sufficient heat was stored in the catalyst bed to supply the necessary heat for the endothermic reaction.

This general method of operation, although in wide use, has many inherent disadvantages which could be minimized only by careful engineering and control. For example, (1) there is an uneven temperature distribution in the catalyst bed, (2) because of the cyclic nature of the process, by-passing air through the reactors and repressurizing the reactors produced a "bump" or surge of gas through the system and, (3) due to the desire to maintain a low water partial pressure in the regeneration gas, it was not possible to enjoy the advantages which might result from employment of a high pressure regeneration system.

Accordingly, it is an object of this invention to provide an improved dehydrogenation process which overcomes the disadvantages of the prior art.

It is another object of this invention to provide an improved method of regeneration for a catalytic dehydrogenation process.

It is still another object of this invention to provide a process of improved thermodynamic efficiency for regeneration of dehydrogenation catalysts.

It is still a further object of this invention to improve the method of supplying the endothermic heat requirement for a catalytic dehydrogenation process.

Other objects and advantages of the present invention will become apparent to those skilled in the art from the following description.

Accordingly, the present invention is directed to an improved method for regenerating a bed of catalyst employed in the conversion of hydrocarbons wherein carbonaceous material is deposited on the catalyst which must be periodically removed by compressing regeneration gas to an elevated pressure, preheating by indirect heat exchange said pressurized regeneration gas to an elevated temperature, further heating said preheated regeneration gas by direct combustion of a combustible material therewith and passing said heated regeneration gas to said catalyst bed to remove carbonaceous material therefrom, removing regeneration effluent gases from said catalyst bed and employing said regeneration effluent gases at an elevated temperature in said indirect heat exchange step. In one aspect or modification, the regeneration gas effluent stream passes to a fired turbine which develops sufficient energy or brake horsepower (B.H.P.) to not only drive the regeneration air compressor but also supplies additional shaft B.H.P. which may be used for other services, such as, pressurizing the hydrocarbon product recovery section of the process.

In accordance with a prior method of operation, an aliphatic hydrocarbon material was catalytically dehydrogenated in an operating cycle in which the catalyst was alternately in periods of dehydrogenation and regeneration, whereby heat produced in said regeneration step by burning of the carbonaceous deposits on said catalyst supplied heat for said dehydrogenation reaction. Regeneration of the reactors, in a multiple reactor system wherein one or more reactors were on stream while the remaining reactor or reactors were on purge or regeneration, was accomplished by passing hot air, generally at a temperature of about 1050° F. to about 1175° F., through the reactors in a quantity in large excess of the amount required to simply burn off the carbonaceous deposits acquired on the catalyst during the reaction period. The quantity of excess air served to smooth out the temperature profile of the catalyst bed in the reactor, thus giving an approach to the process advantages which result from an isothermal condition of the reactors at the beginning of the reaction period. Furthermore, in order to limit the temperature drop in the reactors during the reaction period, the cycle time was very short, on the order of from about 16 to about 24 minutes.

The catalysts employed in the conventional dehydrogenation process such as chromia-alumina catalyst, are sensitive to certain impurities such as water, various metals and sulfur. Consequently, there are limitations on the type of fuel which can be burned if a direct fired air heater (the cheapest method) is used to heat the air to a temperature suitable for regeneration of the catalyst of from about 1050° F. to about 1175° F. Since the catalyst is sensitive to the water vapor content of the regeneration gas at the inlet to the reactors it is essential to maintain the water vapor content of the regeneraion gas at a very low value, while the oxygen content has been found to be limited to about 5.0 mol percent minimum for efficient regeneration of the catalyst. Accordingly, residual fuels and gas oils are generally unsuitable for the direct fired air heater because of their metals and sulfur content, while a fuel gas which has a high-hydrogen content may limit the total pressure at which the regeneration can be carried out. Therefore, applicants' invention is in part directed to developing a regeneration system which would overcome the limitations of water partial pressure and mol percent oxygen available for regeneration, thereby providing greater flexibility in the selection of regeneration pressure and allowing use of high-hydrogen content fuels.

Originally low pressure air blowers with conventional motor or steam turbine drives were considered as a means of supplying the large regeneration air requirements, but the initial investment for the exceptionally large size valves and lines as well as the utility operating costs for the air blower were prohibitive. This led to the utilization of a moderately high pressure air regeneration system, from about 25 to about 40 p.s.i.g., wherein air from the compressor discharge was heated to the required regeneration temperature of about 1175° F. in a direct fired burner and the hot effluent gases from the reactors pass through a flue gas "expander" turbine. The operating pressure of the system was chosen so that the power generated by the "expander" was approximately equal to that required to drive the air compressor. Since the fuel required to heat the air to the process temperature for regeneration was required whether or not the expander turbine drove the compressor then by this system utility operating costs for driving the compressor were substantially eliminated. The low pressure gases from the expander were then used to generate process steam before passing to the atmosphere. However, when operating the above regeneration process the first portion of air admitted to a reactor undergoing air purge prior to regeneration must be vented and the reactor must then be pressured up to full regeneration pressure with air. Accordingly, the amount of air required to perform these purge and pressurizing steps was not available to the expander and because of the cyclic nature of the process, this venting or "by-passing" of air produced a "bump" or surge in the quantity of gas flowing to the expander. Furthermore this surge occurred every 2 to 4 minutes and amounted to an instantaneous maximum of 10 to 30 percent of the total normal flow of gas to the expander, resulting in unstable and sometimes impractical, operation of the expander-compressor.

As pointed out above, the process described required that the hot regeneration gases entering the reactor should have a low partial pressure of water at the reactors inlet. Depending upon the hydrogen content of the fuel fired in the regeneration air heater and the moisture content of the fresh air, it became apparent that there would be a certain maximum allowable total pressure at the reactor inlet in order not to exceed the partial pressure of water desired. Firing a distillate fuel of low hydrogen content allowed a maximum regeneration pressure of about 40 p.s.i.g. whereas firing a high-hydrogen make-fuel-gas allowed a maximum regeneration pressure of about 30 p.s.i.g.

Another inherent disadvantage of the prior art process discussed above is the large process gas compression plant which is needed to deliver the reactor effluent hydrocarbon products from about 2 p.s.i.a. to the gas recovery systems at approximately 160 p.s.i.g. If the gas compressor is driven by a condensing steam turbine, the overall thermal efficiency of the steam cycle might be about 16 percent when referred back to the fuel fired in furnaces to generate the motive steam.

Applicants have now found a far superior regeneration process which overcomes the disadvantages of the regeneration process of the prior art with a substantial improvement in utilities and operating cost. Briefly, air for regeneration of the catalyst in the catalytic dehydrogenation reactors is first compressed in a range from about 50 to about 150 p.s.i.a., preferably from about 70 to about 90 p.s.i.a. The compressed air is then preheated by indirect heat exchange with hot regeneration effluent gases to be more fully described hereinafter, and the thus preheated regeneration air under pressure is further heated to the desired temperature of about 1175° F. in a direct fired burner before being passed to the reactor or reactors to be regenerated in a cyclic process. The amount of heat input to the regeneration air by indirect heat exchange as compared to that furnished by direct firing fuel, such as high-hydrogen make gas from the unit or process can be used at the high pressure without exceeding the water limitation, that is to say, maintaining the water partial pressure of the regeneration gases below about 5 p.s.i.a.

In one aspect or modification of this invention applicant's regeneration system includes a fire turbine, the excess brake horsepower (B.H.P.) of the fired turbine over that required to drive the regeneration gas air compressor being used to drive for example the process gas compressor for the product recovery section of the process. This incremental B.H.P. being made available primarily through the efficiency of the turbine, approximately 87 percent. A smaller portion of this additional available B.H.P. is obtainable through the reduced frictional pressure drop between the air compressor discharge and the turbine inlet due to the high regeneration pressure and the remainder is due to the fuel fired in the turbine.

In addition the difference between the steam cycle efficiency and the fired-turbine efficiency represents a potential thermodynamic fuel saving. Moreover, since the regeneration air must be heated to about 1175° F. in any event simply to satisfy the process, it is only the incremental fuel used to raise the air temperature above about 1175° F. which can be charged against the additional B.H.P. supplied; this incremental fuel requirement being relatively small.

In another aspect of this invention, steam generated in the process or air may be bled to the fired turbine during the "bump" or surge period of the process controlled by a suitable cycle timer arrangement without effecting the composition of the regeneration air required in the process or the water vapor content of the regeneration gases admitted to the reactors.

It is also contemplated, within the scope of this invention, to provide means for bleeding additional air to the turbine in sufficient quantities to overcome the surge of gases to the turbine. This may be accomplished by providing an anticipating control in the system with a pressurized air accumulator or airsurge tank connected between the compressor outlet and the turbine inlet. This enables the turbine and compressor to be operated at desired speeds and power output ranges while providing the necessary air requirements to the reactors.

The fired turbine exhaust gases are then passed to a second direct fired burner which raises the temperature of the gases to a level sufficiently elevated to give the desired preheat to the regeneration air discharged from the compressor in an indirect heat exchanger. This indirect heat exchange temperature is generally selected on the basis of the cost of the indirect heat exchanger. From the preheat exchanger the regeneration effluent gases are passed to a third direct fired burner, the hot gases of which are used to produce process steam and steam for power generation.

As an illustration of the magnitude of the total savings of applicants' process over that of the prior art process discussed above, applicant's process for a 47,000 s.t.p.y. (short ton per year) butadiene unit has a saving of about 180,000,000 B.t.u./hr. of fuel and 11,000 g.p.m. of cooling water.

It is believed that the present invention may be best described by reference to the accompanying drawing which shows the inventive features of the present invention as applied, for example, to the regeneration system for a catalytic dehydrogenation process.

In the dehydrogenation of hydrocarbon, for example, the dehydrogenation of butane to butylene or butadiene in a plurality of fixed bed reactors, the process is carried out at temperatures above about 1050° F. and usually at low pressures. In general temperatures between about 1050° F. and about 1300° F. are suitably employed.

Referring now to the drawing which represents the regeneration process for a plant to produce 47,000 short tons per year of butadiene, air at a rate of approximately 800,000 lb./hr. to 1,500,000 lb./hr. is admitted by conduit 2 to compressor 4. The air is pressurized to about 87 p.s.i.a. and passed by conduit 6 to indirect heat exchanger 8 having a capacity of about 168 mm. B.t.u./hr. In heat exchanger 8 the temperature of the air is raised from about 530° F. to about 1000° F. The thus pressurized and preheated air is then passed by conduit 10 to a direct fired burner 12. In burner 12, fuel gas such as tail gas of the dehydrogenation process gas absorber and depropanizer overhead, or any other fuel gas substantially free of metals and sulfur is burned in sufficient quantities to raise the temperature of the air for regeneration to the range of from 1050° F. to about 1200° F. Accordingly, the amount of heat input accomplished by the indirect heat exchanger as compared to the additional heat required by direct firing of fuel permits the use of the high-hydrogen containing fuel gas from the dehydrogenation process or any other source at the high pressure, which maintains the water partial pressure at a low value sufficient to prevent poisoning of the catalyst. The high pressure regeneration gases at a temperature of about 1175° F. are then directed by conduit 15 to a plurality of reactors shown as box 16 on purge and regeneration. The cyclic method for operating a bank or plurality of reactors wherein the reactors consecutively pass through reaction, purge, regeneration, purge and reaction is a part of this invention only to the extent that the regeneration gases are passed to the proper reactor at the proper time in order to purge the catalyst and remove the carbonaceous deposits from the catalyst which supplies the necessary heat to the catalyst bed as hereinbefore described. The regeneration effluent gases recovered from the reactors in box 16 at a temperature of about 1125° F. are then passed by conduit 18 to a fired turbine 20—24. To fired turbine 20—24, additional fuel gas may be added by conduit 22 to further raise the temperature of the gases and increase the B.H.P. (brake-horsepower) developed not only to drive the air compressor connected thereto by shaft 26, coupler 28 and shaft 30, but also to produce additional shaft B.H.P. through shaft 32 provided with power take-off 34 which may be used for other parts of the process. As previously stated, a portion of this additional B.H.P. furnished is due to the reduced frictional pressure drop between the air compressor discharge and the turbine inlet at the high regeneration pressure, and the remainder is due to the fuel fired in the turbine. The turbine exhaust gases at the temperature of approximately 780° F. are then passed by conduit 36 to a second direct-fired burner 38. In burner 38 the temperature of the regeneration effluent gases is raised to the level required to provide indirect heat to the regeneration air discharged from compressor 4 in indirect heat exchanger 8. That is, in direct fired burner 38, fuel oil or a combustible gas is added by conduits 56 and 60 in sufficient quantity to raise the temperature of the regeneration effluent gases during combustion to about 1100° F. The hot gases are then transferred by conduit 40 to indirect preheat exhanger 8 to heat the compressed regeneration gases as hereinbefore described. From indirect heat exchanger 8, the regeneration gases at a temperature of approximately 645° F. pass by conduit 42 to a third direct fired burner 44 to which additional fuel oil or a combustible gas may be added by conduits 56 and 58. In burner 44 the temperature of the regeneration gases is raised to about 850° F. and passed by conduit 46 to process steam generator 48. Water passed to steam generator 48 by conduit 52 may be removed therefrom as steam by conduit 54 or a portion of the steam may be bled through conduit 62 containing valve 64 to conduit 18. The cooled spent regeneration gases may then be removed from steam generator 48 and passed to the atmosphere by conduit 50.

Because of the cyclic nature of the process as previously described, the "bypassing" of air resulting from the purge of the catalyst and pressurization of the reactor produces a "bump" or surge in the quantity of gas flowing to the expander. To overcome the resulting unstable speed and power condition caused by the surge or "bump" in the flow of regeneration gases, it is necessary to either provide a source of makeup power or eliminate the surge of gases to the turbine. Applicant may overcome this condition by providing a source of bleed steam through conduit 62 or in another aspect provide conduit 66 containing valve 68 to bleed air to the system during the surge or "bump." Either valve 64 and/or valve 68 may be tied into a cycle timer, not shown, provided to control the cyclic operation of the process as well as the required amounts of bleed gas to the system.

The great advantage of applicants' process is in its overall thermodynamic efficiency which is much greater than that of the prior art. This is possible since a higher regeneration pressure may be utilized while maintaining a low water partial pressure (less than 5 p.s.i.a), much less fuel is required to effect the regeneration and supply the power requirements of the process and the necessary heat is provided to the catalyst bed for the hydrocarbon conversion reaction.

Various auxiliary equipment have been eliminated from the drawing as a matter of convenience and its use and location will become apparent to those skilled in the art. Various alterations and modifications of the present invention will become apparent to those skilled in the art without departing from the scope of this invention.

We claim:

1. A regeneration process for the catalytic dehydrogenation of hydrocarbons wherein carbonaceous material is deposited on the catalyst and the carbonaceous material is periodically removed by combustion with air the improvement which comprises compressing air to an elevated pressure of from about 50 to about 150 p.s.i.a., in a compression zone, preheating said pressurized air to an elevated temperature by indirect heat exchange with hot regeneration effluent gases, further heating said regeneration air by partial combustion with a combustible material, contacting said heated regeneration air with said catalyst requiring regeneration at a rate sufficient to remove the carbonaceous materials deposited thereon and uniformly heat the catalyst to reaction temperature, removing the regeneration effluent stream at an elevated pressure and temperature from the catalyst and passing the same to a turbine zone, said turbine zone adapted to supply the power requirements of said compression zone, removing the regeneration effluent stream from the turbine zone, passing said regeneration effluent stream from said turbine zone to a direct fired combustion zone with additional combustible material to elevate the temperature of the regeneration effluent stream and passing said regeneration effluent stream at an elevated temperature from said second combustion zone to said indirect heat exchange zone.

2. A regeneration process for the catalytic dehydrogenation of hydrocarbons wherein carbonaceous material is deposited on the catalyst and the carbonaceous material is periodically removed by combustion with air, the improvement which comprises compressing air to an elevated pressure of from about 50 to about 150 p.s.i.a., in a compression zone, preheating said pressurized air to an elevated temperature by indirect heat exchange with hot regeneration effluent gases, further heating said regeneration air by partial combustion with a combustible material, contacting said heated regeneration air with said catalyst requiring regeneration at a rate sufficient to remove the carbonaceous materials deposited thereon and uniformly heat the catalyst to reaction temperature, removing the regeneration effluent stream at an elevated pressure and temperature from the catalyst and passing the same to a direct fired expander-turbine zone, said expander-turbine zone adapted to supply the power requirements of said compression zone, adding a combustible material to said regeneration effluent stream passed to said expander-turbine zone for combustion therewith to increase the power output of the expander-turbine, removing the regeneration effluent stream from the expander-turbine zone, passing said regeneration effluent stream from said expander-turbine zone to a second direct fired combustion zone with additional combustible material to elevate the temperature of the regeneration effluent stream and passing said regeneration effluent stream at an elevated temperature from said second combustion zone to said indirect heat exchange zone.

3. In an endothermic process for the catalytic conversion of hydrocarbons employing a plurality of fixed catalyst beds which become contaminated with carbonaceous deposits and periodically require regeneration with a combustible gas, the improvement for effecting the regeneration of the catalyst bed and heating the catalyst bed to conversion temperatures which comprises pressurizing a combustible gas to a pressure above 50 p.s.i.a., in a pressurizing zone, passing the thus pressurized combustible gas to an indirect heat exchange zone, elevating the temperature of the combustible gas in said indirect heat exchange zone, passing said combustible gas at an elevated temperature from said indirect heat exchange zone to a first combustion zone, burning a portion of said combustible gas in said first combustion zone to further elevate the temperature thereof, passing the combustible gas at an elevated temperature and pressure from said first combustion zone to said catalyst bed to remove carbonaceous deposits therefrom, removing regeneration effluent gases from said catalyst bed, passing said regeneration effluent gases to a second combustion zone with additional combustible material to burn the combustible material and raise the temperature of said regeneration effluent gases, expanding said regeneration effluent gases in an energy generation zone to provide the energy requirements of said pressurizing zone, removing the expanded regeneration effluent gases from said energy generation zone and passing the same to a third combustion zone, burning additional combustible material with said expanded regeneration effluent gases in said third combustion zone to elevate the temperature thereof and passing said regeneration effluent gases at an elevated temperature from said third combustion zone to said indirect heat exchange zone.

4. An improved process for effecting the regeneration of a bed of catalyst contaminated with carbonaceous deposits which comprises pressurizing a regeneration gas in a compression zone to a pressure above 70 p.s.i.a., heating said pressurized regeneration gas to an elevated temperature by indirect heat exchange with hot regeneration effluent gases in a heat exchange zone, passing said preheated pressurized regeneration gas to a first combustion zone, elevating the temperature of said preheated pressurized regeneration gas by partial combustion with a combustible material in said first combustion zone while maintaining the partial pressure of water in the regeneration gas below that which will poison the catalyst, passing said regeneration gas at an elevated temperature and pressure from said first combustion zone to said catalyst bed requiring regeneration, effecting the regeneration of said catalyst in said catalyst bed, removing regeneration effluent gas from said catalyst bed, expanding said regeneration effluent gas at an elevated temperature in a power generation zone, generating sufficient power in said power generation zone for effecting said regeneration gas pressurizing step, removing expanded regeneration efficient gas from said power generating zone and passing the same to a second combustion zone, elevating the temperature of said regeneration effluent gas in said second combustion zone by burning combustible material therewith and passing said regeneration effluent gas at an elevated temperature from said second combustion zone to said indirect heat exchange zone.

References Cited in the file of this patent
UNITED STATES PATENTS

| | | |
|---|---|---|
| 2,167,698 | Vose | Aug. 1, 1939 |
| 2,449,096 | Wheeler | Sept. 14, 1948 |
| 2,758,979 | Guthrie | Aug. 14, 1956 |
| 2,773,013 | Wolf et al. | Dec. 4, 1956 |